US011263195B2

(12) United States Patent
Gui et al.

(10) Patent No.: US 11,263,195 B2
(45) Date of Patent: Mar. 1, 2022

(54) TEXT-BASED SEARCH OF TREE-STRUCTURED TABLES

(71) Applicant: ServiceNow, Inc., Santa Clara, CA (US)

(72) Inventors: Qiang Gui, Kirkland, WA (US); Peng Wang, Kirkland, WA (US); Olivier Baxa, Kirkland, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/871,448

(22) Filed: May 11, 2020

(65) Prior Publication Data

US 2021/0349875 A1 Nov. 11, 2021

(51) Int. Cl.
| | | |
|---|---|---|
| *G06F 16/00* | (2019.01) | |
| *G06F 16/22* | (2019.01) | |
| *G06F 16/245* | (2019.01) | |
| *G06F 16/903* | (2019.01) | |
| *G06F 16/93* | (2019.01) | |
| *G06F 16/248* | (2019.01) | |

(52) U.S. Cl.
CPC ........ *G06F 16/2282* (2019.01); *G06F 16/245* (2019.01); *G06F 16/248* (2019.01); *G06F 16/90344* (2019.01); *G06F 16/94* (2019.01)

(58) Field of Classification Search
CPC ............... G06F 16/2282; G06F 16/248; G06F 16/90344; G06F 16/94; G06F 16/245
USPC ........................................................ 707/736
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |

(Continued)

FOREIGN PATENT DOCUMENTS

| | | |
|---|---|---|
| EP | 0433979 | 6/1991 |
| EP | 1607824 | 12/2005 |

(Continued)

*Primary Examiner* — Thanh-Ha Dang
(74) *Attorney, Agent, or Firm* — McDonnell Boehnen Hulbert & Berghoff LLP

(57) ABSTRACT

Embodiments are provided that include receiving a search query that represents a particular table of a plurality of tables contained in a database and that includes an additional criterion. Records are contained within the tables, which are organized in a tree structure. An index of the database contains a plurality of entries, each corresponding to a respective record in the plurality of tables. A particular entry in the index includes a path string that is indicative of a location, within the tree structure, of a table that contains a record that corresponds to the particular entry. The embodiments also include determining whether the entries in the index satisfy the search query by: (i) determining that the path string of the particular entry begins with a further path string of the particular table, and (ii) responsively determining whether a particular record that corresponds to the particular entry satisfies the additional criterion.

20 Claims, 9 Drawing Sheets

(56) References Cited

U.S. PATENT DOCUMENTS

| | | |
|---|---|---|
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,618,727 B1 * | 9/2003 | Wheeler ............... G06F 16/83 707/748 |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,950,815 B2 | 9/2005 | Tijare et al. |
| 6,980,976 B2 | 12/2005 | Alpha et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,769,803 B2 * | 8/2010 | Birdwell ............... G06F 16/2246 709/201 |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,046,353 B2 * | 10/2011 | Waters ............... G06F 16/2272 707/715 |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 8,762,410 B2 * | 6/2014 | Murthy ............... G06F 16/81 707/778 |
| 10,061,841 B2 * | 8/2018 | Xiong ............... G06F 16/285 |
| 10,157,201 B2 | 12/2018 | Chang et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0033328 A1 * | 2/2003 | Cha ............... G06F 16/2329 |
| 2003/0118087 A1 | 6/2003 | Goldthwaite et al. |
| 2003/0200293 A1 | 10/2003 | Fearn et al. |
| 2003/0204513 A1 * | 10/2003 | Bumbulis ............... G06F 16/2246 |
| 2004/0015478 A1 * | 1/2004 | Pauly ............... G06F 16/2272 |
| 2004/0221229 A1 * | 11/2004 | Perry ............... G06F 40/221 715/205 |
| 2005/0015217 A1 | 1/2005 | Weidl et al. |
| 2005/0091356 A1 | 4/2005 | Izzo |
| 2005/0149471 A1 * | 7/2005 | Lassalle ............... G06F 16/322 |
| 2006/0026453 A1 | 2/2006 | Frost et al. |
| 2006/0053122 A1 * | 3/2006 | Korn ............... G06F 16/84 |
| 2006/0074858 A1 * | 4/2006 | Etzold ............... G06F 16/24549 |
| 2006/0095461 A1 | 5/2006 | Raymond |
| 2006/0167928 A1 * | 7/2006 | Chakraborty ......... G06F 40/123 |
| 2006/0179058 A1 | 8/2006 | Bram et al. |
| 2006/0293942 A1 | 12/2006 | Chaddha et al. |
| 2007/0016604 A1 * | 1/2007 | Murthy ............... G06F 16/81 |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0006314 A1 * | 1/2009 | Balmin ............... G06F 16/835 |
| 2009/0088875 A1 | 4/2009 | Baier et al. |
| 2009/0119257 A1 * | 5/2009 | Waters ............... G06F 16/951 |
| 2009/0228984 A1 | 9/2009 | Sterin |
| 2010/0110932 A1 | 5/2010 | Doran et al. |
| 2011/0202570 A1 * | 8/2011 | Zina ............... G06F 16/24566 707/797 |
| 2013/0297657 A1 * | 11/2013 | Chinchwadkar .... G06F 16/9027 707/797 |
| 2016/0055184 A1 | 2/2016 | Fokoue-Nkoutche et al. |
| 2020/0257732 A1 * | 8/2020 | Oh ............... G06F 16/90348 |

FOREIGN PATENT DOCUMENTS

| | | |
|---|---|---|
| WO | WO 99/34285 | 7/1999 |
| WO | WO 00/52559 | 9/2000 |
| WO | WO 01/59613 | 8/2001 |
| WO | WO 01/79970 | 10/2001 |

* cited by examiner

710A

| SYS_CLASS_NAME | TITLE | | |
|---|---|---|---|
| ID:001 | CMDB | PASSWORD POLICIES | |
| ID:002 | CMDB_CI | CONFIGURATIONS | |
| ID:003 | HARDWARE | MACBOOK 2015 | |
| ID:004 | SOFTWARE | OFFICE 2000 | |
| ... | | | |

720A

TABLE MEMBERSHIP

SYS_CLASS_NAME IN (CMDB_CI, HARDWARE, SOFTWARE, NETWORK, ...)

STRING CRITERION

TITLE CONTAINS "MACBOOK"

| SYS_CLASS_NAME | TITLE | PATH | |
|---|---|---|---|
| ID:001 | CMDB | PASSWORD POLICIES | CMDB |
| ID:002 | CMDB_CI | CONFIGURATIONS | CMDB/CMDB_CI |
| ID:003 | HARDWARE | MACBOOK 2015 | CMDB/CMDB_CI/HARDWARE |
| ID:004 | SOFTWARE | OFFICE 2000 | CMDB/CMDB_CI/SOFTWARE |
| ... | | | |

720B

TABLE MEMBERSHIP

PATH STARTSWITH CMBD/CMDB_CI

STRING CRITERION

TITLE CONTAINS "MACBOOK"

FIG. 7B

TEXT-BASED SEARCH OF TREE-STRUCTURED TABLES

BACKGROUND

It is beneficial in many contexts to be able to search within a corpus of documents or other objects for those that are similar to a search query. Such a search query may be a search string that includes one or more words. In such examples, the identity, ordering, or other information about the words in the search string may be compared to textual contents (e.g., to lists of keywords, to sentences, paragraphs, or otherwise structured text, or other textual contents) of documents in a corpus of documents in order to determine which of the documents are likely to be relevant to the search string. The documents or other objects can be assigned to tables, e.g., in order to provide an organizational structure. The tables themselves can be part of a tree structure, with each table having one or more parent tables and/or one or more child tables. In such examples, performing a search within the corpus of documents or other objects may include limiting the search to specified tables within the tree structure, e.g., to a particular table and all child tables of the particular table.

SUMMARY

Records in a database can be organized in a variety of ways. In some examples, the records may be contained within a set of tables. The records could each be related to a component or aspect of a managed network, e.g., types of hardware or software composing the managed network, individual instances of hardware or software composing the network, operational logs, incident reports, user profiles, system configurations, databases or other storage of the managed network, or elements or aspects of the managed network. In such an example, each table of the database could contain records related to a particular topic, e.g., a first table could include records related to hardware for a first managed network, a second table could include records related to software for the first managed network, a third table could include records related to network configurations for the first managed network, a fourth table could include records related to hardware for a second managed network, etc.

The tables could be organized into a tree structure. For example, a level of tables, each relating to a respective different managed network, could be children of a top-level table related to a remote network management system that operates to remotely manage the different managed networks. A third level of tables could then be directed to aspects of each of the different managed networks. For example, a table relating to a first managed network could have, as children, tables related to the hardware, software, network configurations, etc. of the first managed network.

Using a database containing such an organization of tables can include searching for records that are contained within a selected table or in any child tables of the selected table. For example, searching for all instances of a search string in any record relating to a particular managed network could include searching a particular table related to the particular managed network as well as any tables that are direct or indirect children of the particular table (i.e., searching records in the particular table, records in tables that are direct children of the particular table, tables that are direct children of the tables that are direct children of the particular table, etc.).

In practice, such a search will employ an index of the records in the database. However, searching all of the records contained in a particular table and all of its child tables can be expensive with respect to computational resources like processor cycles and memory bandwidth. This is because, while the index may contain information about the table membership of the records, such information does not contain, in itself, information about the set of tables that are parents of the tables containing the records. Accordingly, searching through only those records that are within a particular table or its child tables can be computationally expensive, requiring comparison between the table membership indicated in the index for each record and a long list of tables that includes the target table as well as all of its child tables.

Embodiments provided herein provide improvements to the performance of a database searching system or method by expanding the index to include a path string for each record. This path string includes the name of the table containing the record as well as the names of all of the tables that are parents of the table containing the record (i.e., the direct parent of the table containing the record, the parent of that table, etc.). Thus, the cost of searching all of the records contained in a particular table and all of its child tables can be reduced. This is because the path of the particular table can be compared to the path string for the entries in the index. If the path string in the index begins with the path of the particular table, then the corresponding record is either in the particular table or in a child table of the particular table. The entries in the index can be sorted according to the path string to provide additional reductions in the time and computational cost required to perform such a search through the index.

Accordingly, a first example embodiment may involve a computer-implemented method that includes: (i) receiving a search query that represents a particular table of a plurality of tables contained in a database and that includes an additional criterion, wherein the database also contains an index, wherein each table contains a respective plurality of records, wherein the tables are organized in a tree structure, wherein the index contains a plurality of entries, each of which corresponds to a respective record contained within the plurality of tables, and wherein a particular entry in the index includes a path string that is indicative of a location, within the tree structure, of a table that contains a record that corresponds to the particular entry; (ii) determining whether the entries in the index satisfy the search query, wherein determining whether the particular entry in the index satisfies the search query comprises: (a) determining that the path string of the particular entry begins with a further path string of the particular table, and (b) responsive to determining that the path string of the particular entry begins with the further path string of the particular table, determining whether a particular record that corresponds to the particular entry satisfies the additional criterion; and (iii) transmitting an indication of one or more entries of the index that satisfy the search query.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

In a fifth example embodiment, a computational instance of a remote network management platform is provided that includes: (i) a database, and (ii) one or more processors configured to perform operations in accordance with the first example embodiment in connection with the database.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A depicts an index to records in a database and a search query, in accordance with example embodiments.

FIG. 7B depicts an index to records in a database and a search query, in accordance with example embodiments.

DETAILED DESCRIPTION

Figure 1:
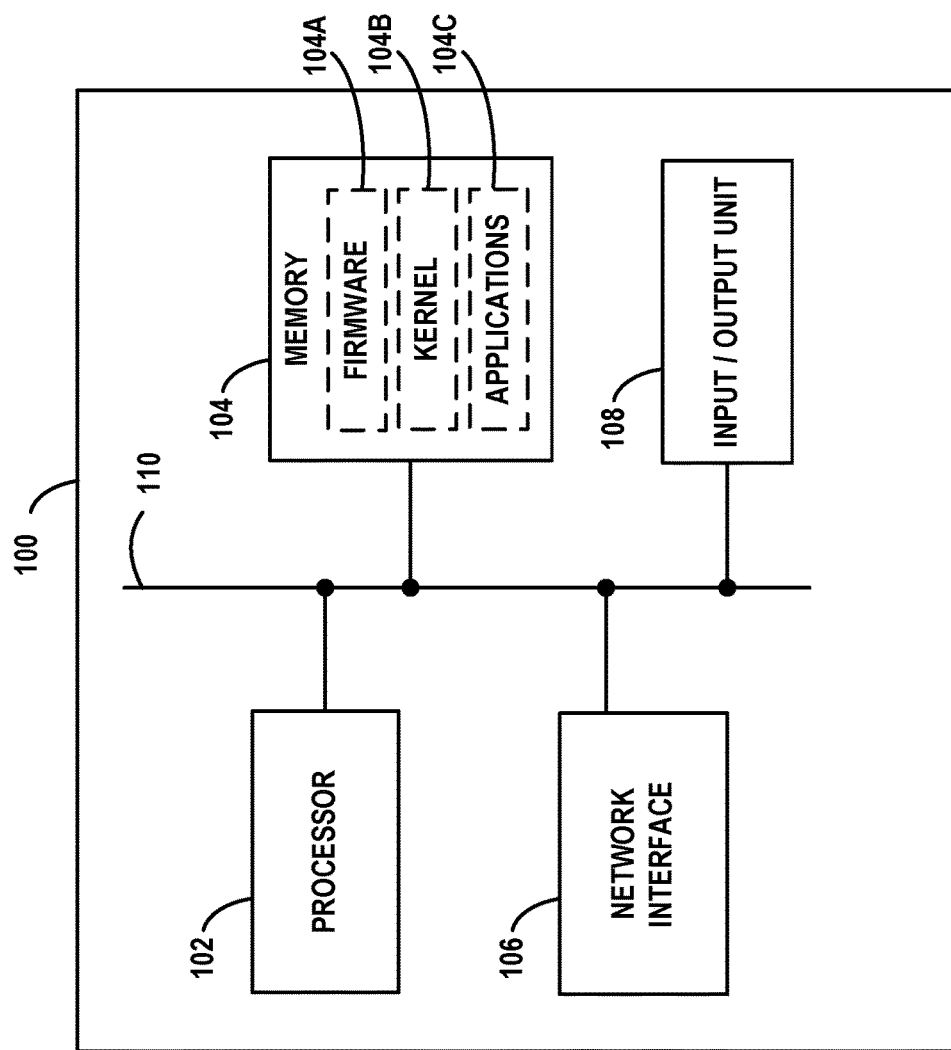
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
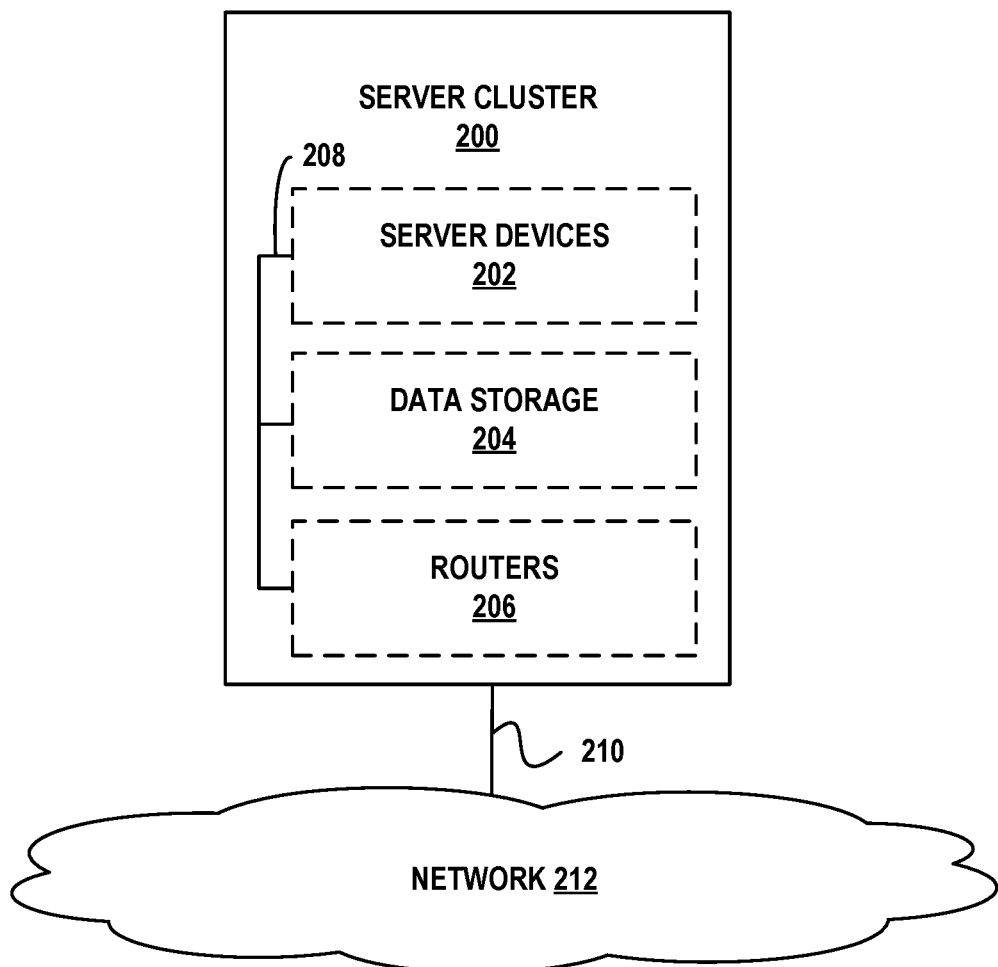
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
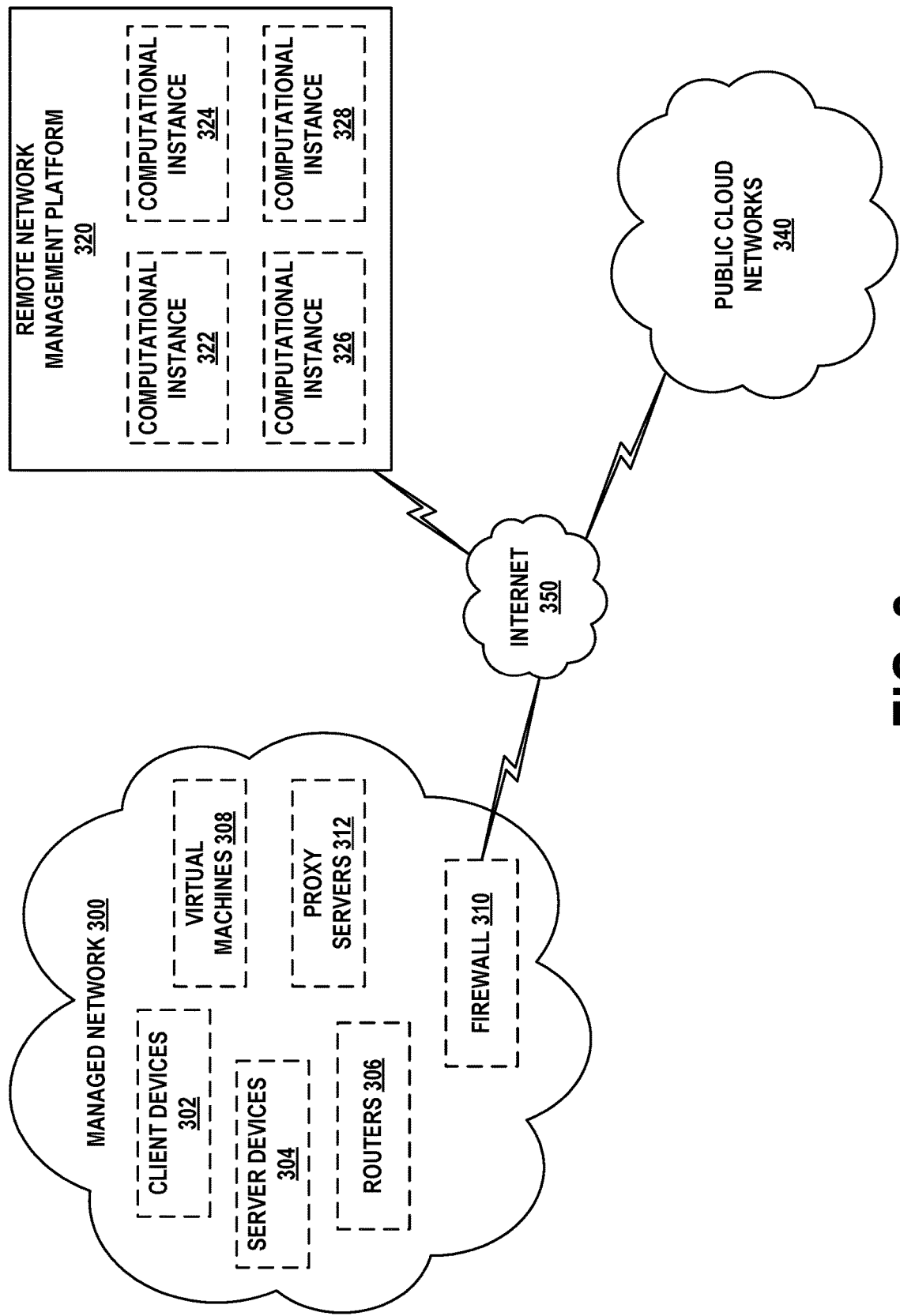
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
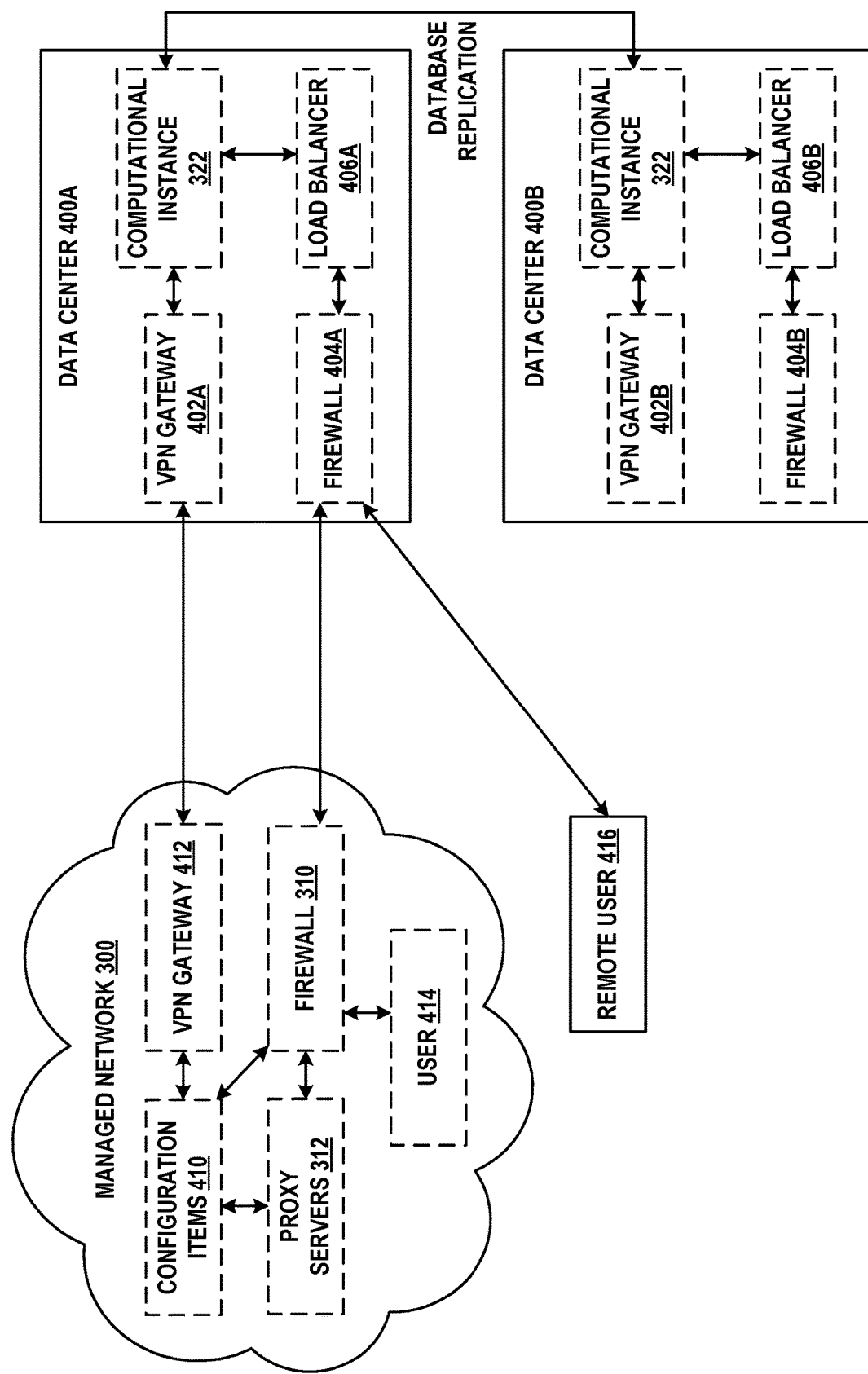
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
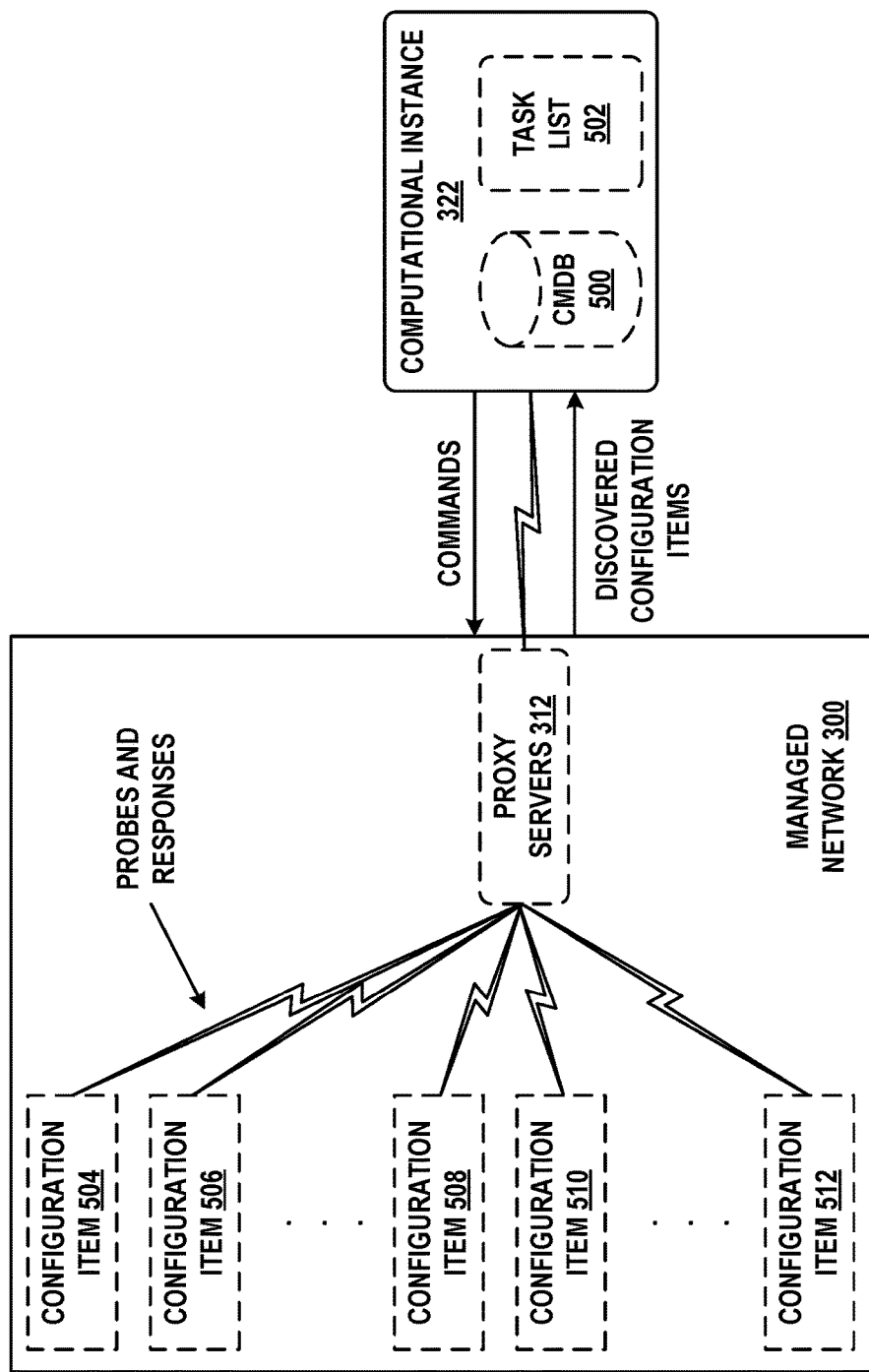
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
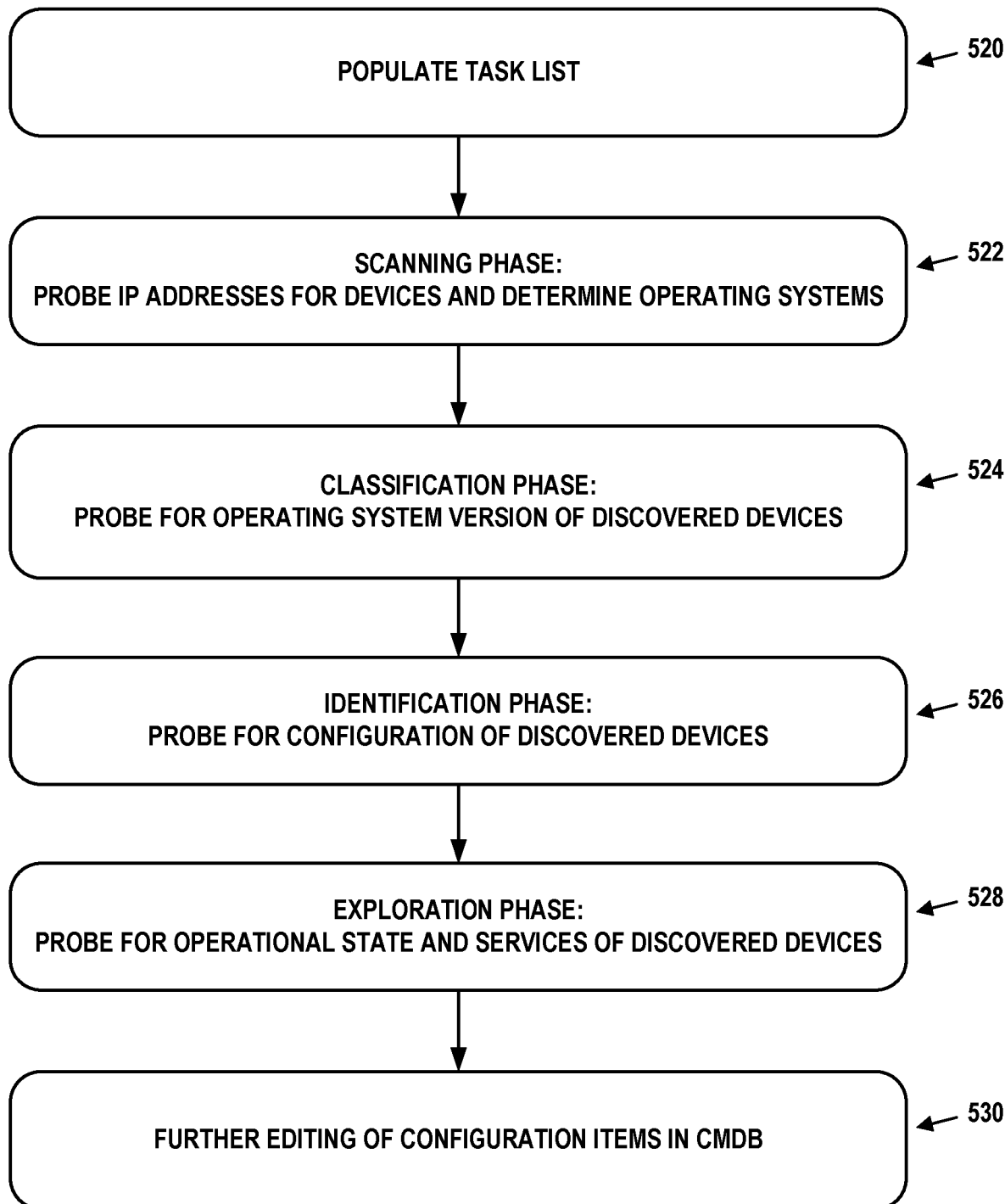
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Index-Based Search of Contents of a Database

Records in a database (e.g., incident reports, hardware or software configurations, or other records that are related to the configuration or operation of a managed network) may be organized in a variety of ways. In some examples, the records could be organized into tables. Each record could thus be contained within a respective table, with each table containing one or more records that may be related in some way. For example, the records in a particular table could all be related to different hardware elements of a particular managed network. Another table could contain records related to different software elements of the particular managed network, and yet another table could contain records related to different hardware elements of a different managed network.

To provide additional organization of records in a database, such tables could be arranged in a variety of ways. Such organization could be represented in within the tables (e.g., in record(s) of the tables, in metadata for each table) or in some other representation (e.g., in a file or other record of a database that contains the tables and their constituent records). This organization could include assigning the tables to levels or categories (e.g., according to priority, according to the type of records contained in the tables, according to the identity of the managed network to which the records of the table are related). This organization could include hierarchical or other directed or undirected relationships between the tables. For example, the tables could be organized into a tree structure.

In such a tree structure, each table has at least one child table and/or one parent table. For example, a 'root' or 'top' table could have no parent tables and one or more child tables. The tree structure could reflect the organization of the records in the tables, with tables higher in the structure containing records relating to higher-level information about the overall configuration and operation of a managed network and tables lower in the structure containing records relating to lower-level information about the configuration and operation of specific elements or sub-elements of a managed network.

Figure 6:
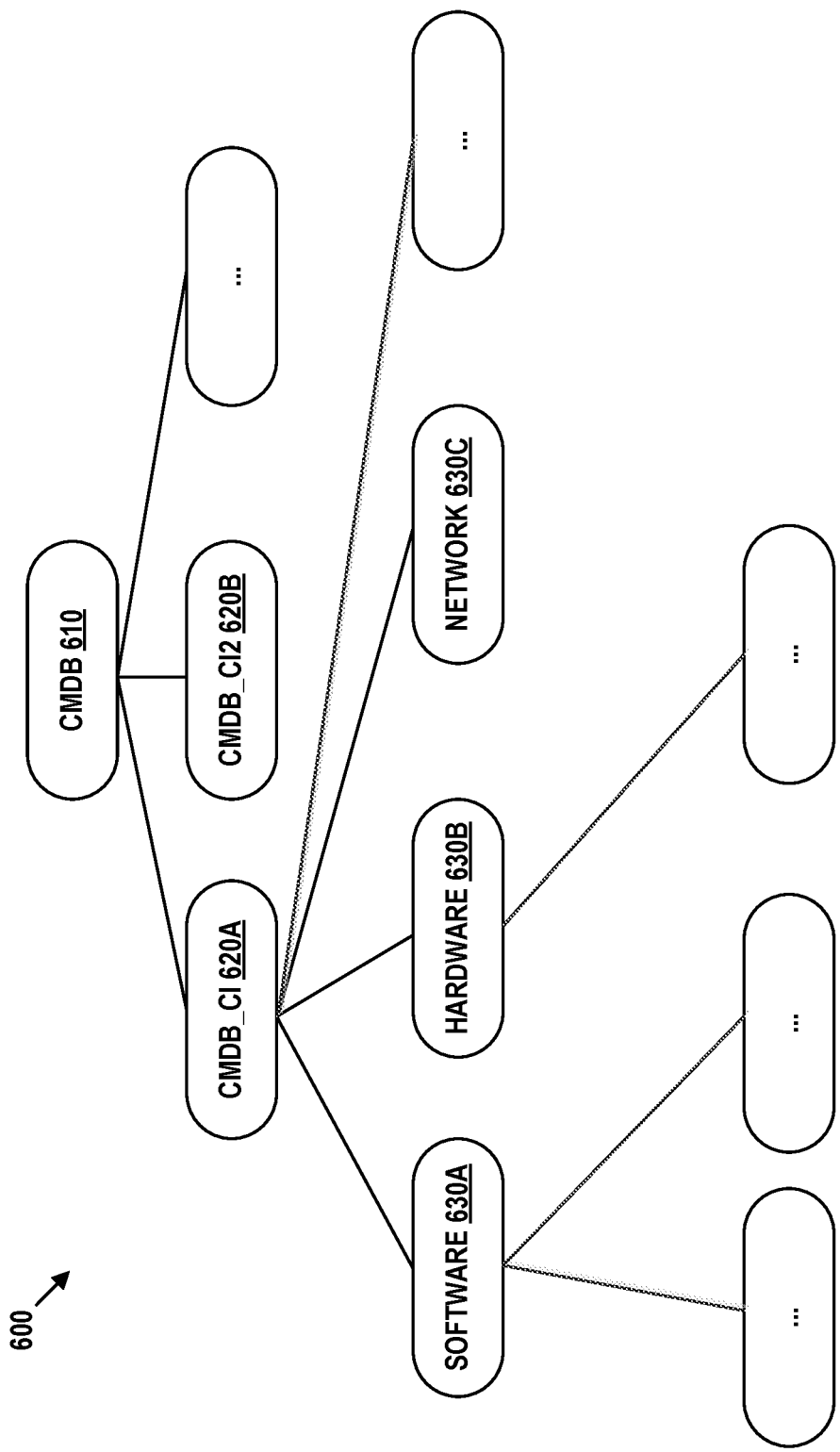
FIG. 6 depicts tables that are contained within a database and that are organized in a tree-based structure, in accordance with example embodiments.

FIG. 6 depicts an example of tables 600 of a database that are organized into a tree structure. The tables 600 contain records relating to the configuration and operation of a remote network management system that remotely manages a number of remote networks. Accordingly, a top-level table ("CMDB") 610 contains records relating to the overall operation of the remote network management system (e.g., user accounts and policies, information relating to the configuration and operation of the remote network management system itself). The top-level table 610 has a number of child tables ("CMDB_CI") 620A, ("CMDB_CI2") 620B that each correspond to respective different managed networks being managed by the remote network management system. Accordingly, those tables 620A, 620B contain records relating to the overall configuration and operation of the respective different managed networks (e.g., user credentials and access policies, lists of services provided by and/or to the managed networks, operational logs). Each of those tables 620A, 620B has, as child tables, tables containing records relating to particular aspects of the operation or configuration of the respective managed network. For example, the table 620A relating to the first managed network includes a number of child tables containing records relating to software of the first managed network ("SOFTWARE" 630A), hardware of the first managed network ("HARDWARE" 630B), network configurations of the first managed network ("NETWORK" 630C), etc. These tables can, themselves, have child tables. For example, the table containing records relating to hardware of the first managed network ("HARDWARE" 630B) could have child tables containing records relating to operational logs for particular hardware elements, to lists of software installed on particular hardware elements, to upgrades applied to particular hardware elements, etc.

The records in the tables and/or the tables themselves may be accessed or interacted with in a variety of ways, e.g., addition, deletion, reading, and/or modification of the records. This may include performing searches through the records in order to find records that are relevant to a particular search query. For example, it could be useful for a technician to receive records containing the string "macbook" in order to diagnose and/or correct an issue that a user is experiencing with a Macbook computer.

To do so, the records in a database may be searched according to a set of criteria in a search query, with records that satisfy the criteria being returned in some manner (e.g., provided in a list of search results along with information representative of the records' contents, with links to the corresponding records in the database, etc.). However, it can be expensive in terms of time and/or computational resources (e.g., processor cycles, memory bandwidth) to search by accessing the records directly, especially where the records are distributed amongst a plurality of different tables and/or stored at different locations within a storage medium or on different storage media. Such a search process may be made less expensive by generating an index of the records in the database and then assessing the search criteria of a search query in whole or in part on information in the index. Since the index may be made smaller in size that the records themselves, the index may be traversed more quickly using less processor cycles and/or memory bandwidth.

Such an index could contain a complete copy of all of the information contained in the records, organized into entries that may be ordered in some way to facilitate search (e.g., ordered with respect to time of creation of their underlying database records). However, such an index is likely to be overly large. In practice, entries of an index may contain representative information for their respective records. This could include a copy of a subset of the information from the records. Such representative information could include copies of information form the records that are small in size and/or likely to be the subject of criteria of a search query, e.g., a category of the record, a modification date or other characteristic date of the record, an identity of a user who created or last modified the record, information about membership in a table, or a title, abstract, problem statement, problem solution, or other textual information. The representative information could also include representations of information that is not copied into the index entry, e.g., a hash, word list, word vector, paragraph vector, list of keywords, or other information representative of textual information from the record. Each entry in an index could also include a link, address, universally unique identifier, or other information sufficient to locate the record that corresponds to each entry.

FIG. 7A illustrates example entries and fields of such an index 710A. Each entry of the index (illustrated as rows in FIG. 7A) corresponds to a respective record contained within one of the tables of the database 600. Each entry in the index is represented by a number of fields including an identification number ("ID"), the identity of the table containing the corresponding record ("SYS_CLASS_NAME"), a title of the corresponding record ("TITLE"), and other information about and/or copied form the corresponding record. Such fields may include, e.g., a creation, modification, access, or other date, an identity of the creator of the record, a category for the record, a version number, a physical location, a managed network user associated with the record, an abstract, short problem statement, long problem statement, problem solution, list of keywords, or other textual information from the record, a paragraph vector, word vector, word list, hash, or other information representative of textual contents of the corresponding record, or some other information Searching for records that satisfy a search query can thus include assessing the criteria of the search query against the information present in the index. Where the information in the index is insufficient to fully determine whether a record satisfies the search query, the contents of the record itself may be accessed and used to assess the search query. For example, the criteria of the search query could include is membership in a particular table (or set of tables) and containing a particular text string. The entries in the index could contain the membership of their respective records but not the entire textual contents of the records. In such an example, the membership criterion of the search query could first be assessed using information contained in the index. If the membership criterion is satisfied for a particular entry in the index, the record corresponding to the particular entry could be accessed and assessed to determine if it contains the particular text string.

In many applications, it is beneficial to perform a search of all of the records within a table and all of it child tables (both direct and indirect child tables). For example, it could be beneficial to perform a search of the records corresponding to a particular managed network by search a table containing records relating to the particular managed network and all direct and indirect child tables of the table (e.g., tables 620A, 630A, 630B, 630C, etc. of the set of tables 600 of FIG. 6). However, where the index contains only the name of the table containing the records, it can be computationally expensive to perform such a search. For example, to accomplish such a search, a list of valid table names, which includes the names of the top-most table and all direct and indirect child tables thereof, could be generated and used as one of the criteria of the search query. The table name could then be compared to the list of table names in order to determine whether the particular record satisfies the search criterion by determining whether the table name matches any of the names in the list of table names.

FIG. 7A illustrates an example search query 720A that includes such a criterion. The search query is specified to return any record relating to the first managed network of FIG. 6 whose title contains the string "macbook." Accordingly, the search query includes two criteria. First, the record must be contained within a table that is the top-most table for the first managed network (620A) or any direct or indirect child thereof (e.g., 630A, 630B, 630C, etc.). Thus, the table name field "SYS_CLASS_NAME" must match one of "CMDB_CI," "HARDWARE," "SOFTWARE," "NETWORK," etc. Second, the "TITLE" field must contain "macbook."

Performing such a comparison may be computationally expensive, especially where a target top-most table has many direct and indirect child tables. Indeed, the process of generating the list of table names from a target table may, itself, be computationally expensive, requiring the tree structure of the tables to be traversed from top to bottom to determine the complete list of direct and indirect child tables of a particular target top-most table.

To reduce the time and computational cost required to perform such searches, the index can be expanded to include an additional field containing a path string. The path string for a particular entry in the index contains a sub-string of the name of the table that corresponds to the entry in the index, as well as sub-strings for every table that is a direct or indirect parent of that table. The sub-strings are in order of the parent-child dependencies, so the sub-string containing the name of the table containing the record is at one end of the path string, and the sub-string containing the top-most table is at the other end of the path string. The path strings can be generated during generation of the index and/or during insertion of additional entries into the index. The path string could be arranged in order from highest to lowest table or lowest to highest. Within the path string, slashes or other single- or multi-character delimiters may be used to distinguish the sub-strings from each other within the path string. Determining whether a record is contained within a particular table or any of its direct or indirect child tables is thus simplified to determining whether the path string begins (or ends, if it is arranged from topmost table to bottom-most) with a string corresponding to the path of the particular table.

FIG. 7B illustrates example entries and fields of such an index 710A. Each entry of the index (illustrated as rows in FIG. 7B) corresponds to a respective record contained within one of the tables of the database 600. Each entry in the index is represented by a number of fields including an identification number ("ID"), the identity of the table containing the corresponding record ("SYS_CLASS_NAME"), a title of the corresponding record ("TITLE"), a path string for the table containing the corresponding record, and other information about and/or copied form the corresponding record. The path string of a particular entry includes sub-strings for the name of the table containing the corresponding record as well as the names of any tables that are direct or indirect parents thereof, in order of their parent-child relationship, and separated by a '/' to delimit the sub-strings from each other. So, entry '001,' which corresponds to a record in the top-most table "CMDB," has a path string that just the name of that top-most table ("CMDB"). In another illustrative example, entry '004,' which corresponds to a record in the table "SOFTWARE," has a path string that is the name of that table, preceded by the names of its parent table "CMDB_CI" and the parent of that table, "CMDB," separated by the '/' delimiter. ("CMDB/CMDB_CI/SOFTWARE").

Performing a search that includes, as a criterion, that a record be contained within a particular table or within a direct or indirect child table thereof is thus simplified to a string comparison operation, when performed on an index that includes such path strings. FIG. 7B illustrates an example search query 720B that includes such a criterion. The search query is specified to return any record relating to the first managed network of FIG. 6 whose title contains the string "macbook." Accordingly, the search query includes two criteria. First, the record must be contained within a table that is the top-most table for the first managed network (620A) or any direct or indirect child thereof (e.g., 630A, 630B, 630C, etc.). Thus, the path name field "PATH" must begin with a 'search path string' "CMDB/CMDB_CI." Second, the "TITLE" field must contain "macbook." Performing such a string comparison is less expensive with respect to both time and computational resources that performing potentially many comparisons between the name of the table containing the record and table names in a list of such table names, as in the example search described in combination with FIG. 7A.

In some examples, the search path string may be received from a user or other process. Additionally or alternatively, an indication of the target table may be received (e.g., as the name or other unique identifier of the table, or by detecting a user touch, button press, or other interaction with a representation of the table) and the search path string determined therefrom. This could include looking up the path string for the indicated table in an index, generating the path string of the table by traversing the tree structure of tables, or taking some other action.

To further reduce the time and/or computational cost of performing such a search, the entries in the index can be ordered according to path string. This has the effect of ensuring that all of the entries corresponding to records that are contained within a target table or its direct or indirect child tables with be arranged, within the index, in a single contiguous sequence. Accordingly, the search query can be assessed on the entries in the index by traversing the index from one end to the other. Once a hit is found with respect to the search path string, the index traversal continues until an entry is found that does not satisfy the search path string criterion (e.g., an entry whose path string does not begin (or end) with the search path string). Encountering such an entry means, in an index whose entries are ordered with respect to path string, that no further entries will satisfy the search path string criterion. Accordingly, the index traversal can be terminated in response to finding the entry that does not satisfy the search path string criterion after having found one or more entries that do satisfy the search path string criterion. This provides the benefit of avoiding the time and computational cost of assessing the search path string criterion and/or other search criteria on the latter entries in the index.

VI. Example Operations

Figure 8:
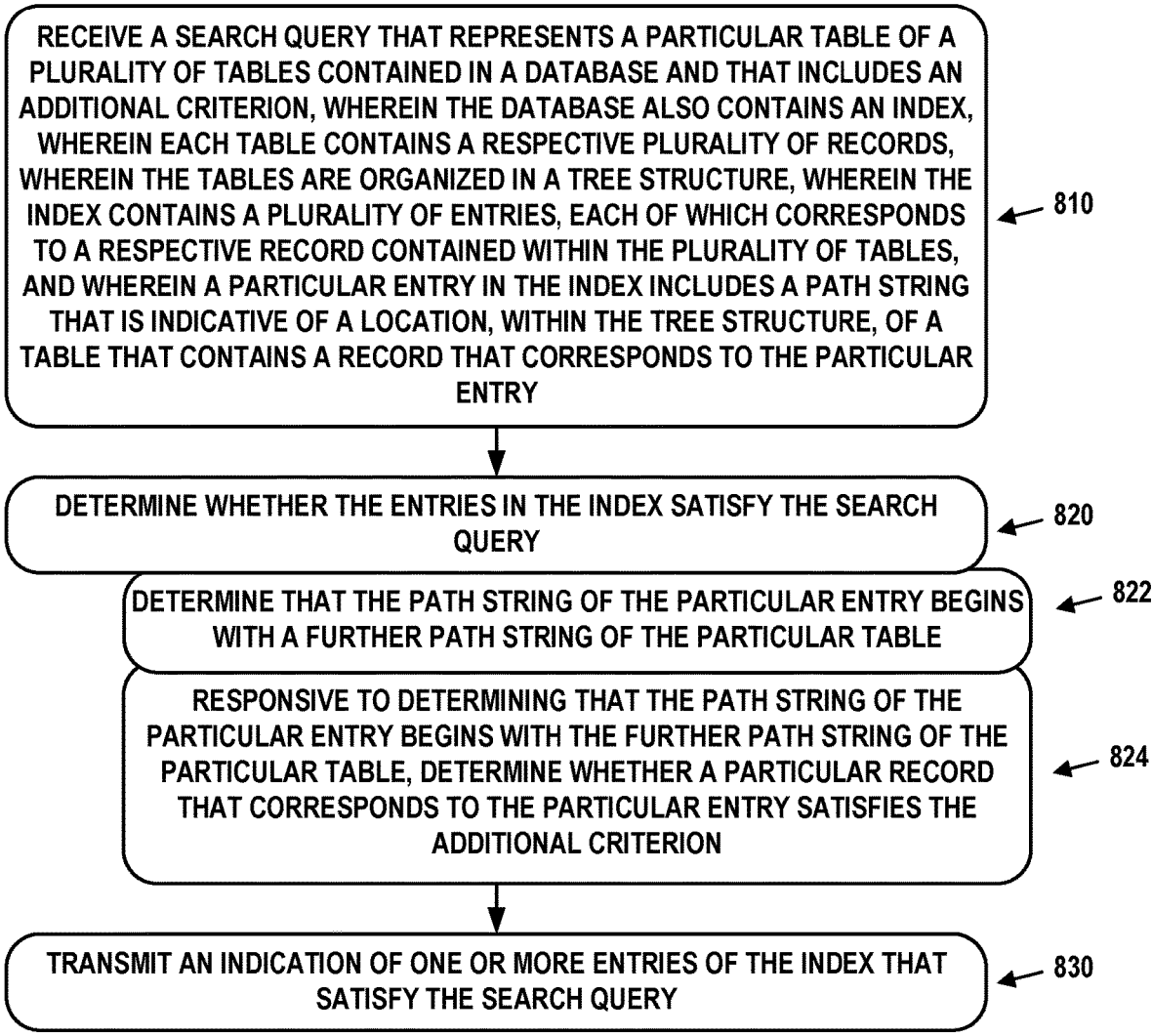
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200.

However, the process can be carried out by other types of devices or device subsystems. For example, the process could be carried out by computational instance of a remote network management platform.

The embodiments of FIG. 8 may be simplified by the removal of any one or more of the features shown therein. Further, these embodiments may be combined with features, aspects, and/or implementations of any of the previous figures or otherwise described herein.

In the example embodiment of FIG. 8, persistent storage (e.g., a database) exists that contains a plurality of tables related to operation of a managed network. Such a managed network can be associated with a computational instance that includes one or more processors configured to perform elements of the example embodiment of FIG. 8. The tables are organized in a tree structure, with each table of the plurality of tables being a parent to one or more of the other tables and/or being a child to one of the other tables. The persistent storage also contains an index. The index contains a plurality of entries, each of which corresponds to a respective record contained within the plurality of tables. A particular entry in the index includes a path string that is indicative of a location, within the tree structure, of a table that contains a record that corresponds to the particular entry.

Each table of the plurality of tables contains and/or references a respective plurality of constituent records that are related to operation of the managed network. Such records could be text based records, e.g., incident reports that include information related to the operation of the managed network. Such incident reports can include a title, short description, a problem description, a resolution, or other sections related to the description, resolution, or other aspects of an incident or other event related to the managed network.

The example embodiment of FIG. 8 includes receiving a search query that represents a particular table of a plurality of tables contained in a database and that includes an additional criterion (810). Such a search query could be received from a client device. Receiving the search query could include receiving the search query via a text box or other elements of a GUI. The additional criterion could include a text string, a category, a username, or some other information that a record must match and/or contain in order to satisfy the additional criterion. For example, the additional criterion could include a text string (e.g., "macbook") that must be contained within textual content of a record and/or that must be contained within a particular textual field of the record (e.g., a "title" string of the record) in order for the record to satisfy the additional criterion. The example embodiment of FIG. 8 could include transmitting, to a client device, an indication of the GUI (e.g., HTML or other information sufficient to generate the GUI on a display or other user interface element(s)). Such a GUI could be provided, e.g., via a web interface. For example, the client device could send a request, over the Internet, for a technical support website or other service, and an indication of the contents of the GUI could be responsively transmitted to the client device.

The example embodiment of FIG. 8 additionally includes determining whether the entries in the index satisfy the search query (820). This includes determining that the path string of the particular entry begins with a further path string of the particular table (822), and, responsive to determining that the path string of the particular entry begins with the further path string of the particular table, determining whether a particular record that corresponds to the particular entry satisfies the additional criterion (824). In some examples, the entries are arranged within the index in order with respect to path string, and the entries of the index are traversed in order to determine whether the entries in the index satisfy the search query. In such examples, determining whether the entries in the index satisfy the search query could additionally include: (i) determining that the path string of an entry in the index that is subsequent to the particular entry does not begin with the further path string of the particular table, and (ii) responsive to determining that the path string of the subsequent entry does not begin with the further path string of the particular table, terminating traversal of the entries of the index.

The example embodiment of FIG. 8 also includes transmitting an indication of one or more entries of the index that satisfy the search query (830). This could include causing display of a title, incident number, or other representative information about each entry that satisfies the search query (e.g., as part of links leading to additional information about respective different entries) and/or causing display of text or other contents of the entries. The displayed entries could include the n highest entries with respect to a degree of satisfaction of the additional criterion (e.g., with respect to a degree of correspondence between a text string of the additional criterion and textual content of the records).

The example embodiment of FIG. 8 could include additional or alternative steps or elements. For example, the method could include, based on the plurality of tables, generating the index. In another example, the method could include generating the path string of the particular table based on the search query.

In some embodiments, determining the search score for the particular text-based record additionally includes: (i) determining a similarity between the two or more words of the search string and a set of words that is present in the particular text-based record; and (ii) calculating the search score for the particular text-based record based on the augmented slop distance and the similarity. Determining the similarity between the two or more words of the search string and the set of words that is present in the particular text-based record could include determining TF-IDF values, word vectors, paragraph vectors, or some other information for the set of words that is present in the particular text-based record.

In some embodiments, the particular entry in the index includes a link to the particular record, the additional criterion includes a text string, and determining whether the particular record satisfies the additional criterion includes following the link to the particular record in order to determining whether any portion of the contents of the particular record matches the text string.

In some embodiments, the particular entry in the index includes information about contents of the particular record, the additional criterion includes a text string, and determining whether the particular record satisfies the additional criterion includes determining whether any portion of the information about contents of the particular record matches the text string.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computational instance of a remote network management platform comprising:
    a database containing a plurality of tables and an index, wherein each table contains a respective plurality of records, wherein the tables are organized in a tree structure, wherein the index contains a plurality of entries, each of which corresponds to a respective record contained within the plurality of tables, wherein a first entry in the index includes a first path string that is indicative of a location, within the tree structure, of a first table that contains a first record that corresponds to the first entry, wherein a second entry in the index includes a second path string that is indicative of a location, within the tree structure, of a second table that contains a second record that corresponds to the second entry, and wherein the second table is located, within the tree structure, below the first table such that the second path string begins with the first path string and includes an additional sub-string related to the location of the second table relative to the first table within the tree structure; and
    one or more processors configured to:
        receive a search query that represents the first table and that includes an additional criterion;
        determine whether the entries in the index satisfy the search query, wherein determining whether the second entry in the index satisfies the search query comprises: (i) determining that the second path string of the second entry begins with the first path string of the first table, and (ii) responsive to determining that the second path string of the second entry begins with the first path string of the first table, determining whether the second record that corresponds to the second entry satisfies the additional criterion; and
        transmit an indication of one or more entries of the index that satisfy the search query.

2. The computational instance of claim 1, wherein the one or more processors are further configured to, based on the plurality of tables, generate the index.

3. The computational instance of claim 1, wherein the second entry in the index includes information about contents of the second record, wherein the additional criterion includes a text string, and wherein determining whether the second record satisfies the additional criterion comprises determining whether any portion of the information about the contents of the second record matches the text string.

4. The computational instance of claim 1, wherein the entries are arranged within the index in order with respect to path string, and wherein the entries of the index are traversed in order to determine whether the entries in the index satisfy the search query.

5. The computational instance of claim 4, wherein determining whether the entries in the index satisfy the search query additionally comprises:

determining that a path string of an entry in the index that is subsequent to the second entry does not begin with the path string of the first table, and responsive to determining that the path string of the subsequent entry does not begin with the first path string of the first table, terminating traversal of the entries of the index.

6. The computational instance of claim 1, wherein the one or more processors are further configured to generate the first path string of the first table based on the search query.

7. The computational instance of claim 1, wherein the second entry in the index includes a link to the second record, wherein the additional criterion includes a text string, and wherein determining whether the second record satisfies the additional criterion comprises following the link to the second record in order to determine whether any portion of contents of the second record matches the text string.

8. A computer-implemented method comprising:

receiving a search query that represents a first table of a plurality of tables contained in a database and that includes an additional criterion, wherein the database also contains an index, wherein each table contains a respective plurality of records, wherein the tables are organized in a tree structure, wherein the index contains a plurality of entries, each of which corresponds to a respective record contained within the plurality of tables, wherein a first entry in the index includes a first path string that is indicative of a location, within the tree structure, of the first table that contains a first record that corresponds to the first entry, wherein a second entry in the index includes a second path string that is indicative of a location, within the tree structure, of a second table that contains a second record that corresponds to the second entry, and wherein the second table is located, within the tree structure, below the first table such that the second path string begins with the first path string and includes additional content related to the location of the second table relative to the first table within the tree structure;

determining whether the entries in the index satisfy the search query, wherein determining whether the second entry in the index satisfies the search query comprises: (i) determining that the second path string of the second entry begins with the first path string of the first table, and (ii) responsive to determining that the second path string of the second entry begins with the first path string of the first table, determining whether the second record that corresponds to the second entry satisfies the additional criterion; and transmitting an indication of one or more entries of the index that satisfy the search query.

9. The computer-implemented method of claim 8, further comprising:

based on the plurality of tables, generating the index.

10. The computer-implemented method of claim 8, wherein the second entry in the index includes information about contents of the second record, wherein the additional criterion includes a text string, and wherein determining whether the second record satisfies the additional criterion comprises determining whether any portion of the information about the contents of the second record matches the text string.

11. The computer-implemented method of claim 8, wherein the entries are arranged within the index in order with respect to path string, and wherein the entries of the index are traversed in order to determine whether the entries in the index satisfy the search query.

12. The computer-implemented method of claim 11, wherein determining whether the entries in the index satisfy the search query additionally comprises:

determining that a path string of an entry in the index that is subsequent to the second entry does not begin with the first path string of the first table, and responsive to determining that the path string of the subsequent entry does not begin with the first path string of the first table, terminating traversal of the entries of the index.

13. The computer-implemented method of claim 8, further comprising:

generating the first path string of the first table based on the search query.

14. The computer-implemented method of claim 8, wherein the second entry in the index includes a link to the second record, wherein the additional criterion includes a text string, and wherein determining whether the second record satisfies the additional criterion comprises following the link to the second record in order to determine whether any portion of contents of the second record matches the text string.

15. An article of manufacture including a non-transitory computer-readable medium, having stored thereon program instructions that, upon execution by a computing device, cause the computing device to perform operations comprising:

receiving a search query that represents a first table of a plurality of tables contained in a database and that includes an additional criterion, wherein the database also contains an index, wherein each table contains a respective plurality of records, wherein the tables are organized in a tree structure, wherein the index contains a plurality of entries, each of which corresponds to a respective record contained within the plurality of tables, wherein a first entry in the index includes a first path string that is indicative of a location, within the tree structure, of the first table that contains a first record that corresponds to the first entry, wherein a second entry in the index includes a second path string that is indicative of a location, within the tree structure, of a second table that contains a second record that corresponds to the second entry, and wherein the second table is located, within the tree structure, below the first table such that the second path string begins with the first path string and includes additional content related to the location of the second table relative to the first table within the tree structure;

determining whether the entries in the index satisfy the search query, wherein determining whether the second entry in the index satisfies the search query comprises: (i) determining that the second path string of the second entry begins with the first path string of the first table, and (ii) responsive to determining that the second path string of the second entry begins with the first path string of the first table, determining whether the second record that corresponds to the second entry satisfies the additional criterion; and transmitting an indication of one or more entries of the index that satisfy the search query.

16. The article of manufacture of claim 15, wherein the second entry in the index includes information about contents of the second record, wherein the additional criterion includes a text string, and wherein determining whether the second record satisfies the additional criterion comprises determining whether any portion of the information about the contents of the second record matches the text string.

17. The article of manufacture of claim 15, wherein the entries are arranged within the index in order with respect to path string, and wherein the entries of the index are traversed in order to determine whether the entries in the index satisfy the search query.

18. The article of manufacture of claim 17, wherein determining whether the entries in the index satisfy the search query additionally comprises:
   determining that a path string of an entry in the index that is subsequent to the second entry does not begin with the first path string of the first table, and
   responsive to determining that the path string of the subsequent entry does not begin with the first path string of the first table, terminating traversal of the entries of the index.

19. The article of manufacture of claim 15, further comprising:
   generating the first path string of the first table based on the search query.

20. The article of manufacture of claim 15, wherein the second entry in the index includes a link to the second record, wherein the additional criterion includes a text string, and wherein determining whether the second record satisfies the additional criterion comprises following the link to the second record in order to determine whether any portion of contents of the second record matches the text string.

* * * * *